Nov. 4, 1969     J. M. FISHER     3,476,338

INFLATABLE RAMP

Filed Dec. 4, 1967

INVENTOR
JOHN M. FISHER
BY Robert R. Yurich
ATTY.

United States Patent Office 3,476,338
Patented Nov. 4, 1969

3,476,338
INFLATABLE RAMP
John M. Fisher, Cuyahoga Falls, Ohio, assignor to The B. F. Goodrich Company, New York, N.Y., a corporation of New York
Filed Dec. 4, 1967, Ser. No. 687,765
Int. Cl. B64d 25/14
U.S. Cl. 244—137                                3 Claims

ABSTRACT OF THE DISCLOSURE

An inflatable aircraft walkway for providing an emergency evacuation ramp from the base of an emergency wing exit to a point on the aircraft wing section featuring a variable overall ramp length to compensate for the sloping contour of the wing section, and further featuring a pair of inflatable margin rails.

BACKGROUND OF THE INVENTION

This invention relates to emergency evacuation equipment for aircraft and more particularly to an inflatable wing ramp for emergency exits immediately over the wing of the aircraft.

The requirements for evacuating airline passengers in the event of an emergency become more important as the size of aircraft and number of passengers increases. Emergencies on takeoff and landing often demand swift removal of the passengers from the aircraft because of potential injuries from fire and explosion.

The most obvious method of more quickly evacuating 500 passengers from a single aircraft is to provide more individual emergency exists. Preferably, these exits should be positioned as close to the passenger seating as possible.

A substantial number of passenger seats are normally located directly over the wing section of a low wing aircraft. Therefore, it is extremely desirable to locate an emergency exit door immediately over the aircraft wing so that the passengers can leave the aircraft by stepping out onto the wing.

For military aircraft, and especially for large troop-carrying aircraft, it may also be desired to provide auxiliary wing exits on the aircraft to facilitate the unloading of a large number of troops in as short of time as possible.

While it is desirable to provide wing exits for large commercial and military aircraft, the passenger deck level of a low winged aircraft is considerably higher than the wing. Emergency exit doors over the wing section must be located several feet above the wing. Furthermore, the design of aircraft wings provide the upper wing surface with a substantial pitch. Consequently, to evacuate passengers from a wing exit the passengers must drop several feet from the exit opening onto a sloping wing surface. It is readily apparent that in an emergency, a substantial number of injuries may be encountered at such an exit during the hurried departure of the passengers.

In order to minimize the possibility of injuries at the emergency wing exits, it is desirable to provide some type of auxiliary evacuation equipment for use at wing exits that would compensate for the substantial drop from the exit door to the wing and the slope of the wing section.

In designing any such auxiliary equipment, it is an absolute requirement that the equipment incorporate lightweight features that would not add substantially to the weight of the aircraft. In addition, the equipment must be compact when not in use and capable of storage in a minimum storage space.

As a result of the emergency nature of any aircraft evacuation system, it is a further absolute requirement of any system that it be capable of assembly and availability in as short a time as possible.

Another feature desired in any evacuation equipment is that the equipment both in fact and in appearance provide the passengers with a sturdy and stable means for departing from the aircraft. This will assure the safety of the passengers and in addition provide the passengers with confidence in using the evacuation equipment.

SUMMARY OF THE INVENTION

According to this invention, an auxiliary wing evacuation walkway is provided by an inflatable wing ramp projecting from the foot of the wing exit door to a point on the aircraft wing, the inflatable wing ramp including a generally flat walkway surface and a tapered end projection in contact with the sloping aircraft wing, and a pair of inflatable guide rails attached to the side margins of the inflatable wing ramp.

The inflatable wing evacuation walkway of this invention provides a lightweight structure that can be compactly stored on an aircraft and quickly assembled at a wing door exit in the event of an emergency. When inflated, the walkway of this invention provides a stable structure over which passengers can safely and confidently depart during an emergency situation.

DETAILED DESCRIPTION

Figure 1:
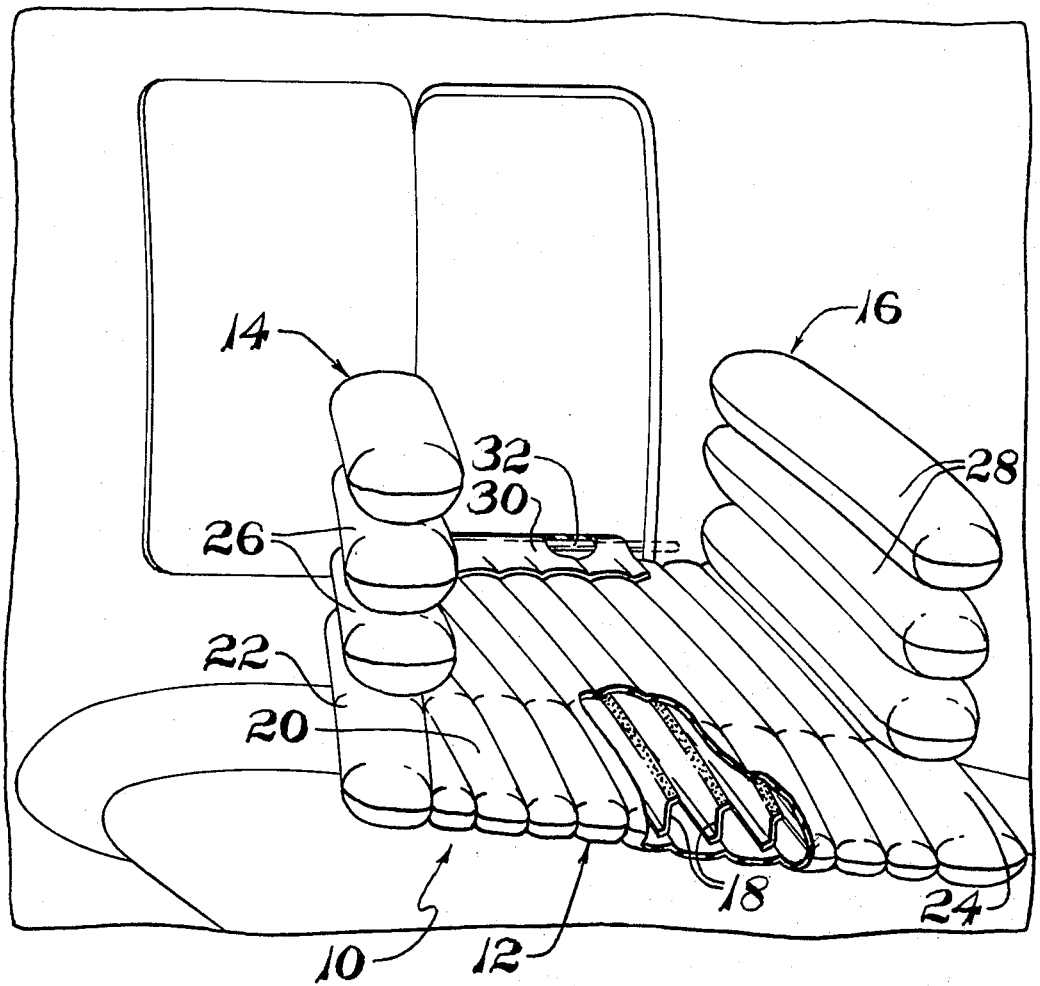
FIG. 1 is an end view of an inflatable walkway extending from the base of a wing exit door onto the aircraft wing section, including cut-away sections of the walkway structure.

Referring to FIG. 1, the inflatable walkway 10 generally includes an inflatable ramp 12 and a pair of inflatable side rails 14 and 16.

In this preferred FIG. 1 construction, the inflatable ramp 12 is held in the generally flat platform-like configuration of FIG. 1 by a plurality of substantially parallel internal bulk heads 18, 18 which extend between the two large area walls of the inflatable ramp 12. The ramp 12 and the internal bulkheads 18, 18 are preferably fabricated from a neoprene rubber coated square-woven fabric material. The number of internal bulkheads 18, 18 is determined by the desired size and shape of the ramp 12. The use of a larger number of more closely spaced internal bulkheads 18, 18 will reduce the degree of surface irregularities of the upper surface 20 of ramp 12. The generally flat platform-like configuration of ramp 12 may also be obtained by bonding a plurality of individual small diameter inflatable tubes in a single plane. However, in this tube construction, each of the individual tubes would have to be inflated through interconnecting ports. Therefore, the bulkhead construction of the ramp 12 of FIG. 1 is preferred since the bulkheads 18, 18 facilitate the inflation of the entire walkway 10.

The upper surface 20 of the ramp 12 is preferably coated with a non-slip rubber coating to improve the passengers' footing on the walkway.

The length of the left margin 22 of ramp 12, as viewed in FIG. 1, and being the side of the ramp 12 nearest the nose of the aircraft, is normally shorter than the length of the right margin 24. The overall length of ramp 12 gradually increases from the short length at margin 22 to the longer length at margin 24 as shown in FIG. 1, so that when the ramp 12 is fully inflated, the extreme end of walkway 10 contacts the wing section at a gradually increasing distance away from the exit door. This predetermined dimensional relationship between the slope of the wing section and the overall length of ramp 12 assures that in an emergency where all the aircraft's landing gears are intact, the walkway 10 is substantially horizontal relative to the axis of the aircraft while the walkway generally descends in the direction transverse of the aircraft axis. In this situation, the departing passengers can descend down a single slope rather than two variable slopes.

Preferably, the extreme end portion of ramp 12 is tapered to a reduced thickness to reduce step down between walkway 10 and the wing section. This reduced thickness end portion is formed by the tapered ends of bulkhead 18, 18.

The vertical guide rail 14 is formed by three inflatable tubes 26 which are assembled on the left margin 22 of ramp 12 in the manner shown in FIG. 1. These tubes 26 are adhesively bonded to each other so that when inflated, they form a rigid vertical supporting rail for walkway 10. These inflatable tubes 26 are preferably fabricated from a neoprene rubber coated nylon fabric similar to the material used for ramp 12.

In a similar manner, the vertical guide rail 16 on the right margin 24 of ramp 12 is formed by three inflatable tubes 28 adhesively bonded to each other in the manner shown in FIG. 1.

The inflatable ramp 12 may be attached to the foot of the exit door by any number of methods. However, in this construction, referring to FIG. 1, the inflatable ramp 12 includes an exterior flap 30 that extends beyond the base of the exit door and terminates in an overlapping end portion through which an attachment bar 32 may be extended in the manner shown in FIG. 1. The attachment bar 32 extends beyond the width of the flap 30 and the exit door opening. The ends of attachment bar 24 are held inside the fuselage body thereby supporting the exit door end of walkway 10.

The entire inflatable walkway 10 may be inflated with a single inflation source such as a pressure bottle (not shown). In this instance, the inflatable walkway 10 must include a manifold arrangement interconnecting the ramp 12 and guide rails 14 and 16. The use of internal bulkheads 18, 18 having lengths less than the overall length of ramp 12 provides a means for communicating air throughout the ramp 12. The guide rails 14 and 16 may be inflated with the same pressure source by providing interconnecting communication ports between the ramp 12 and the bags 26 and 28.

Normally, the inflatable walkway 10 is stored in an uninflated condition. The use of flexible rubber coated materials permits walkway 10 to be folded when uninflated into a relatively small compact unit that can be stored either in the base of the exit door opening or on the inside edge of the exit door itself. Since the wing exit is normally an emergency exit, it is possible for the attachment rod 32 to be in place at all times.

In the event of an emergency, the wing exit door is opened and the inflatable walkway 10 removed from its storage compartment and dropped from the door onto the wing section with external flap 30 and rod 32 in an attached position. Simultaneously, the pressure source is activated to inflate the walkway 10 to the condition shown in FIG. 1.

The walkway 10, when in its fully inflated condition, provides a sturdy ramp of gradually decreasing slope extending from the base of the exit door to the wing of the aircraft. The passengers may pass through the exit door over the non-slip surface 20 of ramp 12 and onto the wing section. The passengers may use the sturdy rails 14 and 16 to further support themselves as they descend down walkway 10. Once on the wing section, the passengers may then leave the wing in any number of ways depending on the condition of the emergency.

I claim:
1. An inflatable walkway structure for providing an emergency gangway from an aircraft wing exit door onto the adjoining sloping wing section comprising a generally flat inflatable ramp including an exit door engaging end portion, a floor surface adapted to extend from said exit door, said ramp being of gradually increasing overall length across the width of the ramp to provide a wing engaging end portion adapted to contact the sloping wing section so that the width of the ramp is substantially parallel to the floor of the exit along the entire length of the ramp, means on said exit door engaging end position for attachment of said ramp to the foot of the exit door, and means for inflating the ramp in the event of an emergency.

2. An inflatable walkway structure according to claim 1 wherein said inflatable ramp includes a plurality of lengthwise internal bulkheads extending internally of the ramp and interconnecting two opposing flexible walls forming the opposing sides of the ramp to provide the ramp with a substantially parallel upper floor surface and an underside surface.

3. An inflatable walkway structure according to claim 2 wherein each of the lengthwise margins of said ramp includes a plurality of inflatable tubes stacked on the margins to provide opposing guide rails for the inflatable walkway, and means for interconnecting said inflatable tubes to the interior of said ramp to provide communication throughout the entire walkway thereby permitting inflation of the walkway from a single pressure source.

References Cited

UNITED STATES PATENTS

| | | | |
|---|---|---|---|
| 511,472 | 12/1893 | Sumovski. | |
| 2,602,944 | 7/1952 | Richardson | 14—71 |
| 2,677,141 | 5/1954 | Senn | 14—71 |
| 2,765,131 | 10/1956 | Boyle | 193—25 X |
| 3,102,623 | 9/1963 | Schacht et al. | 244—137 X |
| 3,018,867 | 1/1962 | Heyniger | 244—137 X |

JACOB L. NACKENOFF, Primary Examiner

U.S. Cl. X.R.

14—72; 193—25

UNITED STATES PATENT OFFICE
CERTIFICATE OF CORRECTION

Patent No. 3,476,338                                November 4, 1969

John M. Fisher

It is certified that error appears in the above identified patent and that said Letters Patent are hereby corrected as shown below:

Column 4, line 26, "position" should read -- portion --.

Signed and sealed this 24th day of February 1970.

(SEAL)
Attest:

Edward M. Fletcher, Jr.                      WILLIAM E. SCHUYLER, JR.
Attesting Officer                                   Commissioner of Patents